W. C. HOPPES.
EVENER.
APPLICATION FILED APR. 15, 1912.
1,043,700.
Patented Nov. 5, 1912.
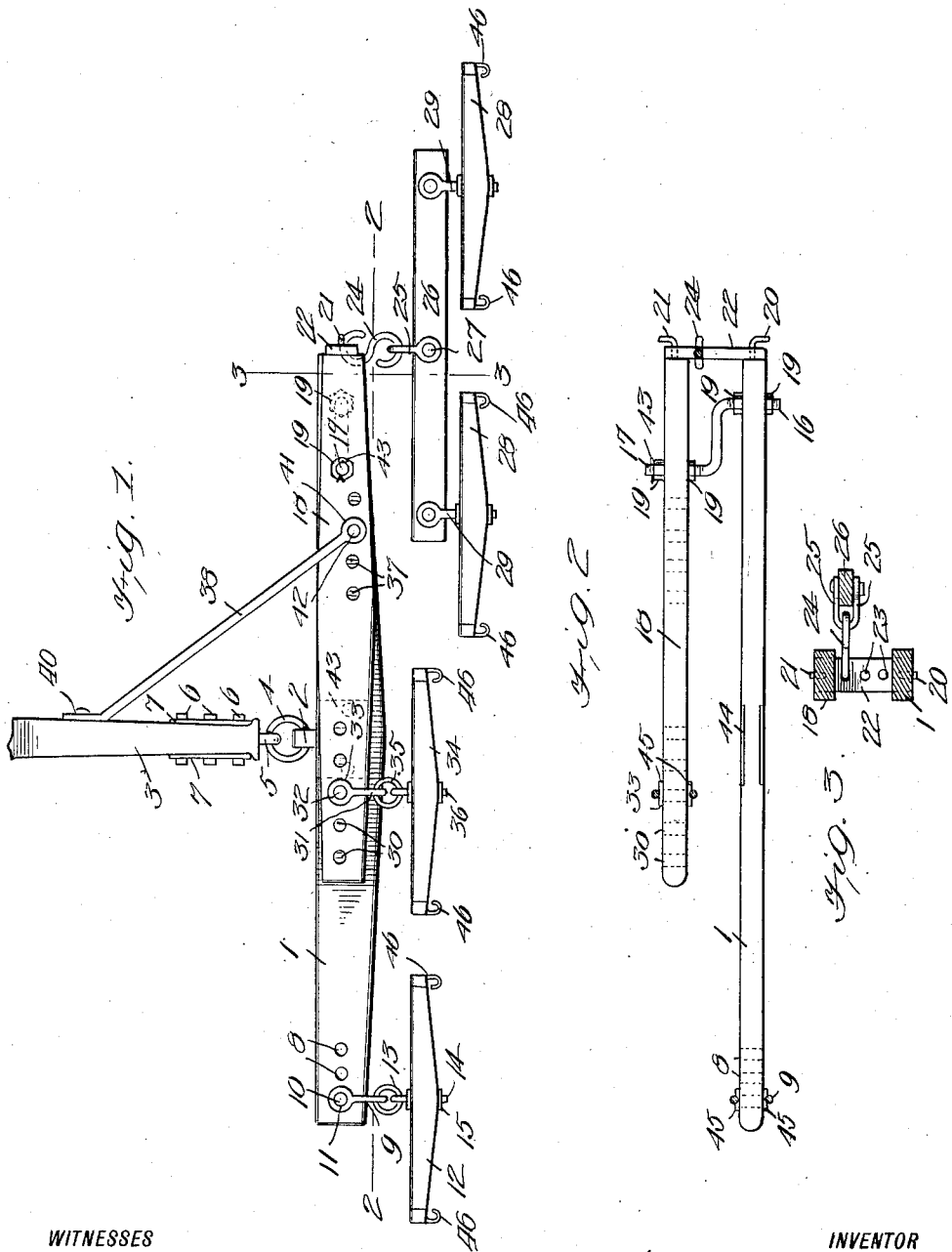
WITNESSES
INVENTOR
William C. Hoppes
BY
ATTORNEYS

UNITED STATES PATENT OFFICE.

WILLIAM C. HOPPES, OF DAWSON, NEBRASKA.

EVENER.

1,043,700.  Specification of Letters Patent.  Patented Nov. 5, 1912.

Application filed April 15, 1912. Serial No. 690,857.

*To all whom it may concern:*

Be it known that I, WILLIAM C. HOPPES, a citizen of the United States, and a resident of Dawson, in the county of Richardson, State of Nebraska, have invented a new and useful Improvement in Eveners, of which the following is a specification.

In the drawings: Figure 1 is a plan view of the improvement; and Figs. 2 and 3 are sections on the lines 2—2 and 3—3, respectively, of Fig. 1.

In the present embodiment of the invention the bar 1 corresponding to the usual double tree, is provided with a clip 2 at its center and on its rear face for connection with the tongue or draft bar 3. A ring 4 is provided for making the connection, the said ring engaging the clip 2, and the eye 5 secured to the end of the tongue by means of bolts 6, which pass through the tongue and through arms 7, arranged on opposite sides of the tongue and connected to the eye at their front ends.

One end of the bar 1 is provided with a plurality of openings 8 arranged in a spaced longitudinal series, and a substantially U-shaped clip 9 is connected to the said end of the bar by means of a bolt 10 which passes through bearings 11 in the ends of the arms of the clip and through one of the openings 8.

A swingle tree 12 is connected to the clip by means of a ring 13, the ring engaging the clip at one side and an eye bolt 14 at the opposite side. The eye bolt 14 is passed through the swingle tree and is held in place by a nut 15. The opposite end of the bar 1 is provided with a single opening, in which is received one of the arms 16 of a double crank 16—17. Each of the arms 16—17, which are offset laterally from each other, is threaded, and the arm 17 is passed through an opening in a second bar 18. The bar 18 is arranged directly above the bar 1, and is of such length that, when one end of the bar 18 is in register with one end of bar 1, the opposite end of bar 18 will extend beyond the tongue. Each of the crank arms 16—17 is engaged by nuts 19, the said nuts being arranged on opposite sides of the adjacent bar, and each of the bars 1 and 18 is provided with a hook 20 and 21, respectively, at the end adjacent to the crank. A plate 22 connects the hooks, and the said plate is provided with a longitudinal series of openings 23, the end openings of the series being engaged by the hooks (Figs. 2 and 3).

An S-shaped clip or double hook 24 has one of its ends or hooks engaged with one of the intermediate openings of series 23, and the other end or hook with the clip 25 of a double tree 26 of ordinary construction. The clip is held to the double tree by a pin 27, and a swingle tree 28 is connected to each end of the double tree by means of the usual clip 29.

The double hook 24 and the double tree may be raised or lowered with respect to bar 1, by engaging the hook with different openings of series 23, and the opposite end of the bar 18 is provided with a longitudinal series of openings 30. A substantially U-shaped clip 31 has its arms extending on opposite sides of the bar at the said end, and a pin 32 is passed through bearings 33 at the ends of the arms and through one of the openings of series 30.

A swingle tree 34 is connected to the clip 31, by means of a ring 35, which engages the clip and an eye bolt 36, connected to the swingle tree at its center. The bar 18 is also provided with a longitudinal series of openings 37 near the opposite end from openings 30, and an inclined draft bar has one end connected to the tongue at 40, and the other end is provided with an eye 41 which is adapted to register with one of the openings 37.

A pin 42 is provided for connecting the brace to the bar 18, the said pin passing through the eye 41 and one of the openings of series 37. A cotter pin 43 is passed transversely of crank arm 17 above the nut. A reinforcing shoe 44 is arranged on opposite faces of the bar 1 at the clip 2, and similar shoes 45 are arranged on the said bar and on bar 18 at the clips 9 and 31, respectively.

The swingle trees 12, 28 and 34 are provided with the usual trace hooks 46 for the attachment of the traces. It will be noticed that the bars 1 and 18 bear a certain relation to each other as respects their length. Bar 1 in actual use will be about 6 feet in length, that is, three feet on each side of the tongue, which is a draft bar rather than a tongue.

The plate 22 is six inches in length, and bar 18 is four feet in length. The two draft animals at swingle trees 12 and 34 are balanced by the two draft animals at swingle trees 28. The said animals at trees 28 pull against the ends of bars 1 and 18. The relative draft on bar 1 at the ends is 11 to 1, the crank arm being six inches from the near end of bar 1, while on bar 18 it is 3 to 1, since the crank 17 is one foot from the near end of bar 18.

The draft animals pull against the one at swingle tree 12, and the three are balanced against the one at tree 12, and also against each other. A very great range of adjustment is permitted by the openings 8 for swingle tree 12, the openings 30 for swingle tree 34, the openings 23 for double tree 26, and the openings 37 for the draft rod 38.

The principal advantage possessed by the improved evener, is that when attached to a plow, the draft animal working at the end of the bar 1 may walk in the furrow, and the trace chains will be on a level. That is, the draft animal attached to the swingle tree 9 may walk in the furrow at a lower level than the other draft animals and yet have a straight pull. With the ordinary evener, the trace chains of the animal in the furrow would incline upwardly toward the evener. The trace chains of the draft animal in the furrow may be attached six inches lower than those of the draft animal pulling on the bar 18, provided that the hook 24 is at the upper end of the bar 22. For different depths of furrow the double tree 26 may be adjusted on the bar 22 in accordance with the depth and when the adjustment is so made, each animal connected with the evener pulls with horizontal trace chains.

The animal attached to the inner end of the bar 18 is always balanced with respect to the team on the hook 24, regardless of whether the said animal on swingle tree 34 is ahead or behind the team on double tree 26. This balance is due to the crank arms 16—17. It is obvious that when the animal on swingle tree 34 is ahead of the team on double tree 26 the relative distance between the connection of the crank arms 16—17 is varied and this variation occurs automatically. In addition the improved evener can be attached by means of a tongue or by means of a chain without a tongue. Side draft is also lessened by the balance and adjustment of the parts.

I claim:—

1. A device of the character specified, comprising a bar having means at its center for connecting the bar to a machine to be drawn, a second bar of less length arranged above the first bar at one end thereof, a hook in each bar at their adjacent ends, a plate provided with a longitudinal series of spaced openings having its end openings engaged by the hooks, a double-tree having a hook for engaging one of the openings of the plate, a swingle-tree at each end of the double-tree, a double crank having laterally offset arms, one arm being journaled in each bar near the plate, each of the said bars having a longitudinal series of openings at the end remote from the plate, a swingle tree for each bar, each swingle-tree having means for engaging an opening of the series, said second bar having a longitudinal series of openings near the plate.

2. An evener comprising a pair of superposed bars of unequal length arranged with one end of each bar in vertical alinement, a plate having its ends pivotally connected to the adjacent ends of the bars, a double crank connecting the bars near the plate and comprising a pair of laterally offset arms, one arm being journaled in each bar, a double-tree provided with a hook at its center, said plate having a longitudinal series of spaced openings for engagement by the hook, a swingle-tree at each end of the double-tree, a swingle-tree adjustably connected with each bar at the end remote from the plate, means at the center of the long bar for connecting the said bar to the machine to be drawn, and an inclined draft rod adjustably connected at one end to the short bar at the end adjacent to the plate and connected at the other end to the machine to be drawn.

3. An evener comprising a pair of superposed bars of unequal length arranged with one end of each bar in vertical alinement, a plate having its ends pivotally connected to the adjacent ends of the bars, a double crank connecting the bars near the plate and comprising a pair of laterally offset arms, one arm being journaled in each bar, a double-tree provided with a hook at its center, said plate having a longitudinal series of spaced openings for engagement by the hook, a swingle-tree at each end of the double-tree, a swingle-tree adjustably connected with each bar at the end remote from the plate, and means at the center of the long bar for connecting the said bar to the machine to be drawn.

4. An evener comprising a pair of superposed bars of unequal length arranged with one end of each bar in vertical alinement, a plate having its ends pivotally connected to the adjacent ends of the bars, a double crank connecting the bars near the plate and comprising a pair of laterally offset arms, one arm being journaled in each bar, a double-tree, means for connecting the double-tree to the plate, said means being adjustable vertically, a swingle-tree at each end of the double-tree, and a swingle-tree adjustably connected with each bar at the end remote from the plate.

WILLIAM C. HOPPES.

Witnesses:
J. SPURGIN,
CHAS. ETTER.